Figure 1:
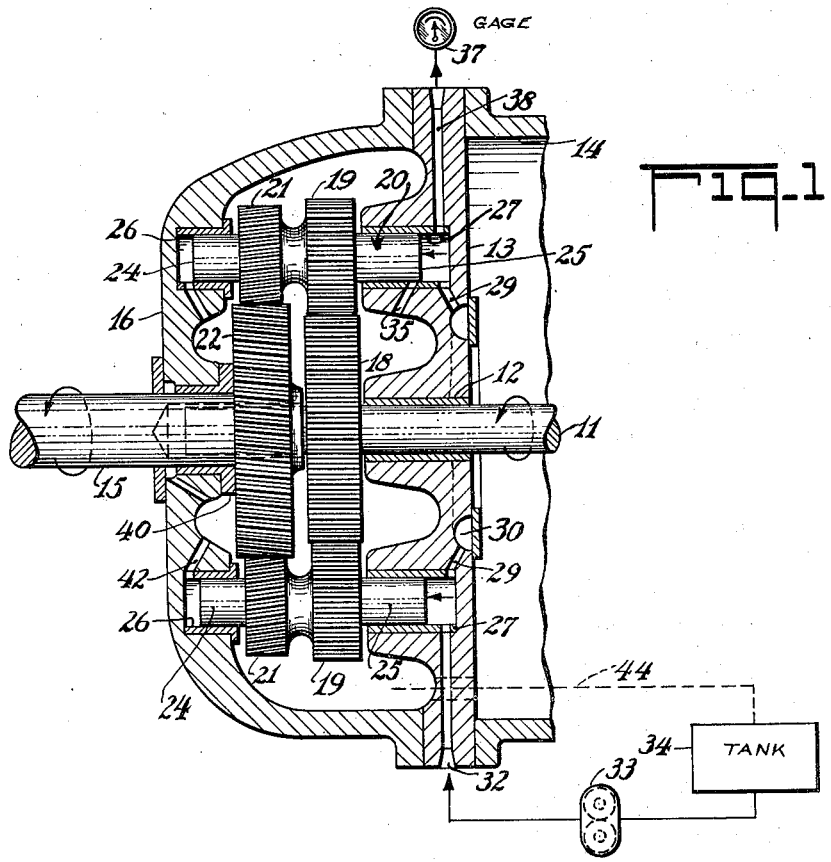

Oct. 9, 1945.    E. S. TAYLOR    2,386,367
GEAR SYSTEMS
Filed Jan. 26, 1942

INVENTOR
Edward S. Taylor.
BY
ATTORNEY

Patented Oct. 9, 1945

2,386,367

UNITED STATES PATENT OFFICE 2,386,367

GEAR SYSTEM

Edward S. Taylor, Lincoln, Mass., assignor to Wright Aeronautical Corporation, a corporation of New York Application January 26, 1942, Serial No. 428,150

13 Claims. (Cl. 74—410)

This invention relates to transmission gearing and is concerned particularly with means to equalize gear tooth loads in a transmission wherein the power transmitted is divided between a plurality of gear engagements.

An object of the invention is to provide means by which gear tooth loads in a parallel gear system are equalized, thereby compensating for manufacturing tolerances, equalizing wear on the parts, and equalizing the forces to which the several gear engagements are subjected. A further object of the invention is to provide means to register, at all times, the torque transmitted by the gearing. A further object is to provide a compact step-up or step-down gearset of high power capacity wherein plural gear tooth engagements is equalized. A further object is to provide a hydraulically energized, automatic compensating system for equalizing gear tooth loads. Still another object is to provide alternate teachings of specific applications of the invention to practicable gearsets, utilizing the tooth load compensation and torque measure features of the invention.

Figure 2:
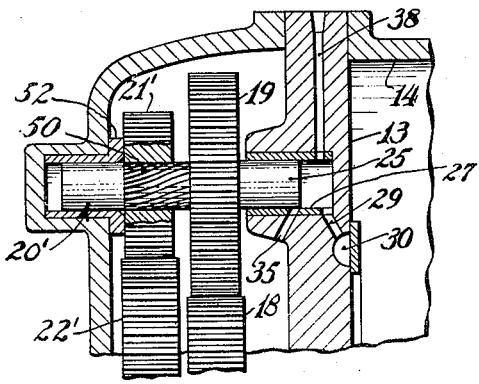

Further objects will be appreciated in reading the detailed description below in connection with the drawing, in which:

Fig. 1 is a longitudinal section of a gearing unit, according to the invention, showing hydraulic connections in diagrammatic form; and Fig. 2 is a fragmentary longitudinal section through an alternate embodiment of the invention.

As shown in Fig. 1, 11 represents a drive shaft borne at 12 in a housing 13 which may, if desired, be secured to a support structure 14 forming a portion of a prime mover. The left end of the shaft 11 is piloted in a driven shaft 15 for rotation relative thereto, the shaft 15 being borne in a gear housing 16 secured to the housing 13. Within the housing 16, the shaft 11 carries a drive spur gear 18 meshed with a multiplicity of pinions 19 integral with layshafts 20 and with helical tooth pinions 21. The latter pinions, which are shown as being smaller than the pinions 19, mesh with a helical tooth driven gear 22 on the driven shaft 15. The layshafts 20 have end journals 24 and 25 rotatable and slidable in bearings 26 and 27, respectively disposed in the housings 16 and 13. The blind ends of the bearings 26 are vented to the interior of the housing. The blind ends of the bearings 27 are all interconnected with one another through drillings 29 and a transfer annulus 30. Thus, the cylindrical cavities formed in the blind ends of the bearings 27 are in free communication with one another, and the layshaft journals 25, in effect, form pistons which are axially movable, as well as being rotatable, in these cylinders. The bearing cavities 27 are fed with fluid through a passage 32 from a pump 33 which in turn is supplied by a tank 34. Only one of the bearing cavities 27 is provided with a bleed aperture 35 which aperture is disposed, axially of its associated bearing, at such a distance from the bearing end that the journal 25 of its associated layshaft 20 will just uncover the aperture 35 when the pinions 19 and 21 are substantially centrally located in the planes of the gears 18 and 22 respectively. Pressure in the intercommunicating bearing chamber system may be measured by a gauge 37 connected to the system through a passage 38.

The pump is chosen so that its capacity is sufficient to supply more than bearing leakage under the pressure conditions encountered in normal full load operation. Pressure imposed in the bearing cylinders 27 acts upon the right hand ends of the journal 25 tending to move them to the left. The one journal 25 uncovers the aperture 35 whereby pressure fluid will bleed therefrom, establishing equal fluid pressure in all the bearing cylinders equal to the counter thrust acting rightwardly upon the layshafts as a result of the axial forces imposed on the pinions 21 due to their helically cut teeth. That is, the one layshaft 20 automatically adjusts itself to give that small opening of valve aperture 35 such that the resulting pump pressure in the bearing cylinders 27 axially balances the then existing axial torque reaction on the layshafts. Axial force due to fluid pressure will of course be applied upon the right hand ends of all of the journals 25, and if any inequalities in the pinion spacing around the gear 22 exists, the several layshafts 20 will take up different axial positions so that the thrust on the layshaft journals 25 will be exactly equal to the tangential tooth load between each pinion 21 and the gear 22 times the tangent of the tooth angle of the helical gears. This pressure will be precisely proportional to the torque transmitted by the transmission and accordingly, the gauge 37 is an accurate indication of torque and may be calibrated in any appropriate manner.

There will of course be a counter thrust acting leftwardly on the gear 22, and this is taken care of by a thrust bearing 40 disposed between the gear 22 and the housing 16. If desired, small drillings may be formed through the layshafts 20 for lubrication of the left hand layshaft bearings 26 which, as shown, are vented to the interior of the gear housing by passages 42 so that no pressure may be built up in the bearings. Hydraulic fluid, preferably a lubricant, which bleeds from the aperture 35 and from the several bearings, drops to the bottom of the housing 16 and is returned to the fluid tank 34 through a drain conduit 44.

Obviously, by suitable location of thrust bearings in the system, both sets of gears may be of helical form, or the gears 18, 19 could be helical while the gears 21, 22 might be spur gears. The use of helically cut gear teeth is considered desirable in this system to secure prompt load compensation between the several sets of layshaft pinions since, under load, there is a continual dynamic urge for the layshafts to move to the right, as shown.

The alternate arrangement of the system, shown in Fig. 2, utilizes the same housing and load compensating structure as that above described. However, the pinions 21' and the gear 22', as well as the pinions 19 and the gear 18, are conventional spur gears. The pinions 19 are rigid with or integral with the layshafts 20' but the pinions 21' are mounted on the layshafts 20' through helical spline connections 50. Further, the pinions 21', since the layshafts are free to move axially with respect to them, are provided with a thrust bearing 52 to establish their axial position, regardless of the axial position of the layshafts 20'. In this system, the drive gear 18 rotates the pinion 19 in the shafts 20' in unison. Driving effort is transmitted from the layshafts 20' to the pinions 21' through the helical spline connections 50 whereby the pinions 21' are forced to rotate with the layshafts, but the layshafts will tend to screw themselves out of the pinions 21' toward the right, until such axial movement is limited by the hydraulic force imposed on the end of the right hand layshaft journal. A counterthrust is of course exerted on the pinions 21' which is taken up by the thrust bearings 52. Since the pinions 21' and the gear 22' are spur gears, no axial thrust is induced by their operation together, and a thrust bearing on the gear 22' becomes unnecessary.

It will be seen from the above that I have provided means for equalizing engagement pressures on a plurality of gears operating in parallel, as well as providing means for measuring the torque transmitted by the gearing. Various modifications will be apparent to those skilled in the art and I do not wish to limit the scope of the patent to the specific arrangement shown either as to gear ratios or gear disposition, except as the invention is limited by the annexed claims.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a transmission, a helical gear, a plurality of helical pinions spaced therearound and meshed therewith, said pinions being mounted on axially movable layshafts, bearings for said layshafts comprising closed cylinders, fluid passage means interconnecting said cylinders, means to maintain in said cylinders and against said layshafts an equal fluid pressure, said pinions being independently axially shiftable to equate individual axial tooth load thereon to the fluid pressure acting on the shaft thereof, and valve means automatically operative to control the magnitude of said fluid pressure with changes in the transmitted torque.

2. In a transmission, a gear, a plurality of pinions spaced therearound and meshed therewith, a layshaft helically splined in each pinion, rotatable therewith and movable axially relative thereto, common means drivably connected with said layshafts, means to constrain said pinions against axial movement, the driving effort between each pinion and its shaft being, in part, converted to axial thrust on each layshaft due to the helical spline connection, and means to resist said axial thrust on each shaft.

3. In a transmission, a gear, a plurality of pinions spaced therearound and meshed therewith, a layshaft helically splined in each pinion, rotatable therewith and movable axially relative thereto, common means drivably connected with said layshafts, means to constrain said pinions against axial movement, the driving effort between each pinion and its shaft being, in part, converted to axial thrust on each layshaft due to the helical spline connection, and interconnected hydraulic pressure cells resisting axial movement, and balancing axial thrust on, the layshafts.

4. In a transmission, a gear, a plurality of pinions spaced therearound and meshed therewith, a layshaft helically splined in each pinion, rotatable therewith and movable axially relative thereto, common means drivably connected with said layshafts, means to constrain said pinions against axial movement, the driving effort between each pinion and its shaft being, in part, converted to axial thrust on each layshaft due to the helical spline connection, interconnected hydraulic pressure cells resisting axial movement, and balancing axial thrust on, the layshafts, and means to determine the hydraulic pressure in said cells.

5. In a transmission, a gear, a plurality of pinions meshed therewith, each of said pinions being mounted for independent axial movement and being urged in an axial direction by a force responsive to the torque load transmitted by the respective pinion, means for applying equal fluid pressure in opposition to each of said torque responsive forces for equalizing the torque loads carried by said pinions, and means automatically operative to adjust the magnitude of said fluid pressure with changes in the transmitted torque.

6. In a transmission, a gear, a plurality of pinions meshed therewith, each of said pinions being mounted for independent axial movement and being urged in an axial direction by a force responsive to the torque load transmitted by the respective pinion, means for applying equal fluid pressure in opposition to each of said torque responsive forces for equalizing the torque loads carried by said pinions, and valve means controlled by movement of only one of said pinions for controlling said fluid pressure.

7. In a transmission, a helical gear, a plurality of helical pinions meshed therewith whereby each of said helical pinions is subjected to an axial force in response to the torque load transmitted by the respective pinion, said pinions being mounted for independent axial movement, means for applying equal fluid pressure in opposition to each of said torque responsive forces for equalizing the torque loads carried by said pinions, and means controlled by movement of one of said pinions for controlling said fluid pressure.

8. In a transmission, a helical gear, a plurality of helical pinions meshed therewith whereby each of said helical pinions is subjected to an axial force in response to the torque load transmitted by the respective pinion, said pinions being mounted for independent axial movement, means for applying equal fluid pressure in opposition to each of said torque responsive forces for equalizing the torque loads carried by said pinions, and means to control said fluid pressure in response to the transmitted torque, and means responsive to said fluid pressure for indicating the transmitted torque.

9. In a transmission, a helical gear, a plurality of shafts each carrying a helical pinion in mesh with said gear and each mounted for independent axial movement, means forming a closed space at one end of each of said shafts and into which said shafts extend, fluid passage means interconnecting said spaces, and means to supply fluid under pressure to said fluid passage means and spaces, and a bleed aperture in one of said spaces adapted to be controlled by axial movement of the associated shaft.

10. In a transmission, a helical gear, a plurality of shafts each carrying a helical pinion in mesh with said gear whereby each of said shafts is subjected to an axial force in response to the torque load transmitted by its associated pinion, said shafts being mounted for independent axial movement, means for applying equal fluid pressure against each of said shafts in opposition to the associated torque responsive force for equalizing the torque loads carried by said pinions, and means controlled directly by movement of one of said shafts for controlling said fluid pressure.

11. In a transmission, a helical gear, a plurality of shafts each carrying a helical pinion in mesh with said gear whereby each of said shafts is subjected to an axial force in response to the torque load transmitted by its associated pinion, said shafts being mounted for independent axial movement, means for applying equal fluid pressure against each of said shafts in opposition to the associated torque responsive force for equalizing the torque loads carried by said pinions, and valve means controlled by axial movements of only one of said shafts for controlling said fluid pressure.

12. In a transmission, driving and driven gears, one of said gears having helical teeth, three or more axially shiftable layshafts having pinions engaging and complementary to said gears, each of said layshafts being subjected to an axial force in response to the torque transmitted by its associated helical gears, means for applying against each of said shafts an equal fluid pressure, and means for varying said fluid pressure in proportion to the transmitted torque for balancing their associated axial torque responsive forces.

13. In a transmission, a helical gear, three or more shafts each carrying a helical pinion in mesh with said gear whereby each of said shafts is subjected to an axial force in response to the torque load transmitted by its associated pinion, said shafts being mounted for independent axial movement, means for applying against each of said shafts an equal fluid pressure, and means controlled directly by axial movement of one of shafts for controlling said fluid pressure.

EDWARD S. TAYLOR.